(12) United States Patent
Li et al.

(10) Patent No.: US 9,265,024 B2
(45) Date of Patent: Feb. 16, 2016

(54) DETERMINING LOCATION OF MOBILE DEVICE

(75) Inventors: Li Li, Beijing (CN); Rui Xiong Tian, Beijing (CN); Wei Xue, Beijing (CN); Yi Xin Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 14/241,702

(22) PCT Filed: Jun. 27, 2012

(86) PCT No.: PCT/CN2012/077622
§ 371 (c)(1),
(2), (4) Date: Jun. 25, 2014

(87) PCT Pub. No.: WO2013/029414
PCT Pub. Date: Mar. 7, 2013

(65) Prior Publication Data
US 2014/0329539 A1    Nov. 6, 2014

(30) Foreign Application Priority Data
Aug. 30, 2011  (CN) .......................... 2011 1 0270296

(51) Int. Cl.
*H04W 4/02*     (2009.01)
*H04W 64/00*    (2009.01)
(Continued)

(52) U.S. Cl.
CPC ............. *H04W 64/00* (2013.01); *G01S 5/0072* (2013.01); *G01S 5/0284* (2013.01)

(58) Field of Classification Search
CPC .................................. H04W 4/02; H04W 4/04
USPC ........................................................ 455/41.2
See application file for complete search history.

(56) References Cited

U.S. PATENT DOCUMENTS

| 6,275,707 | B1 * | 8/2001 | Reed ..................... G01S 5/0072 |
| | | | 342/357.31 |
| 8,180,379 | B2 * | 5/2012 | Forstall .................. G01C 21/12 |
| | | | 455/41.2 |

(Continued)

FOREIGN PATENT DOCUMENTS

| CN | 102016626 A | 4/2011 |
| CN | 101536596   | 5/2012 |

(Continued)

OTHER PUBLICATIONS

Barbeau, Sean et al., "Dynamic Management of Real-Time Location Data on GPS-Enabled Mobile Phones", Dept of Comp Sci and Engr, Univ. of South Fla, Tampa, Fla.

(Continued)

*Primary Examiner* — Christopher M Brandt
(74) *Attorney, Agent, or Firm* — Jeff Tang

(57) ABSTRACT

Embodiments of the present invention relate to a method and apparatus for determining the location of a mobile device. Specifically, the method comprises: receiving the location message from a neighboring mobile device, the location message comprising the location of the neighboring mobile device at the current time which is obtained by the neighboring mobile device through calculation utilizing signals received from satellites; and estimating the location of the mobile device at the current time based on stored locations of the mobile device at historical time, stored locations of the neighboring mobile device at the historical time, and the received location of the neighboring mobile device at the current time.

26 Claims, 5 Drawing Sheets

(51) Int. Cl.
*G01S 5/00* (2006.01)
*G01S 5/02* (2010.01)

(56) References Cited

U.S. PATENT DOCUMENTS

| | | | | |
|---|---|---|---|---|
| 8,634,853 | B2* | 1/2014 | Bogatin | G01S 5/0284 370/310.2 |
| 8,781,496 | B2* | 7/2014 | Richardson | G01S 5/0236 455/41.2 |
| 2002/0055362 | A1* | 5/2002 | Aoyama | G01S 5/0072 455/456.6 |
| 2005/0096037 | A1 | 5/2005 | Haberman | |
| 2007/0126626 | A1 | 6/2007 | Kung | |
| 2007/0205939 | A1 | 9/2007 | Bae | |
| 2008/0280625 | A1* | 11/2008 | Larsen | G01S 5/0226 455/456.1 |
| 2010/0130232 | A1 | 5/2010 | Dingler | |
| 2010/0271260 | A1 | 10/2010 | Guo | |
| 2010/0309044 | A1 | 12/2010 | Ische | |
| 2011/0077027 | A1 | 3/2011 | Wang | |

FOREIGN PATENT DOCUMENTS

| | | |
|---|---|---|
| EP | 2356494 A1 | 8/2011 |
| JP | 2000-102060 A | 4/2000 |
| JP | 2004221991 A | 8/2004 |
| JP | 2010-230380 A | 10/2010 |
| WO | WO2010043658 A1 | 4/2010 |

OTHER PUBLICATIONS

Chung, J.M et al., "Minimised Power Consumping Adaptive Shceduling Mechanism for Cluster-Based Mobile Wireless Networks,", Electronics Letters, Sep. 2009, V: 45, Iss. 19.

Deblauwe, Nico et al., "Combining GPS and GSM Cell-ID positioning for Proactive Location-based Services," Mobile and Ubiquitous Systems, Aug. 2007, p. 1-7, Phileadelphia, PA.

* cited by examiner

DETERMINING LOCATION OF MOBILE DEVICE

CROSS-REFERENCE TO RELATED APPLICATIONS

This application claims priority under 35 U.S.C. §371 from PCT Application, PCT/CN2012/077622, filed on Jun. 27, 2012, which claims priority from Chinese Patent Application No. 201110270296.5, filed on Aug. 30, 2011. The entire contents of both applications are incorporated herein by reference.

FIELD OF THE INVENTION

Embodiments of the present invention relate to the field of information service; specifically, embodiments of the present invention relate to a method and apparatus for determining the location of mobile device.

DESCRIPTION OF THE RELATED ART

Currently, a plurality of location-based services (LBS) evolve in the information service field. These services are information and entertainment services utilizing the geographical location of mobile device. The mobile device (with software and hardware supporting LBS) may access these services via a mobile network so as to be used in a plurality of scenarios. For example, a user of the mobile device may query the LBS for the nearest business or service, such as an ATM or restaurant, locate friend on a map displayed on the mobile device, or receive warning for traffic jam at a place, etc.

SUMMARY OF THE INVENTION

In the context, objectives of the present invention comprise providing a method and apparatus for determining the location of a mobile device, where the method and apparatus may reduce energy consumption of the mobile device and provide highly accurate location estimation.

Some embodiments according to one aspect of the present invention provide a method for determining the location of a mobile device. For example, the method may comprise: receiving location message from a neighboring mobile device, the location message comprising the location of the neighboring mobile device at the current time obtained by the neighboring mobile device through calculation utilizing signals received from satellites; and estimating the location of the mobile device at the current time based on the stored locations of the mobile device at the historical time, the stored location of the neighboring mobile device at the historical time, and the received location of the neighboring mobile device at the current time.

Some embodiments according to another aspect of the present invention provide an apparatus for determining the location of a mobile device. For example, the apparatus may comprise: location message receiving means configured to receive location message from neighboring mobile device, the location message comprising the location of the neighboring mobile device obtained by the neighboring mobile device through calculation utilizing signals received from satellites; and location estimating means configured to estimate the location of the mobile device at the current time based on stored locations of the mobile device at historical time, a stored location of the neighboring mobile device at the historical time, and the received location of the neighboring mobile device at the current time.

The illustrative solutions provided by the illustrative embodiments of the present invention at least may have one of the following notable technical effects:

1. Energy consumption is reduced because the mobile device does not need to frequently perform satellite signal-based locating process that requires high energy consumption.
2. Accuracy of location estimation of the mobile device can be guaranteed because the communication distance supported by short-range communication is rather short (generally less than 10 m).

BRIEF DESCRIPTION OF THE DRAWINGS

Through reading the following detailed description with reference to the accompanying drawings, the above and other objectives, features and advantages of the illustrative embodiments of the present invention will become more comprehensible. In the drawings, a plurality of embodiments of the present invention will be illustrated in an illustrative and non-limiting manner, wherein.

In the drawings, like or corresponding numerical signs indicate the same or corresponding parts.

DETAILED DESCRIPTION OF THE INVENTION

Figure 1:
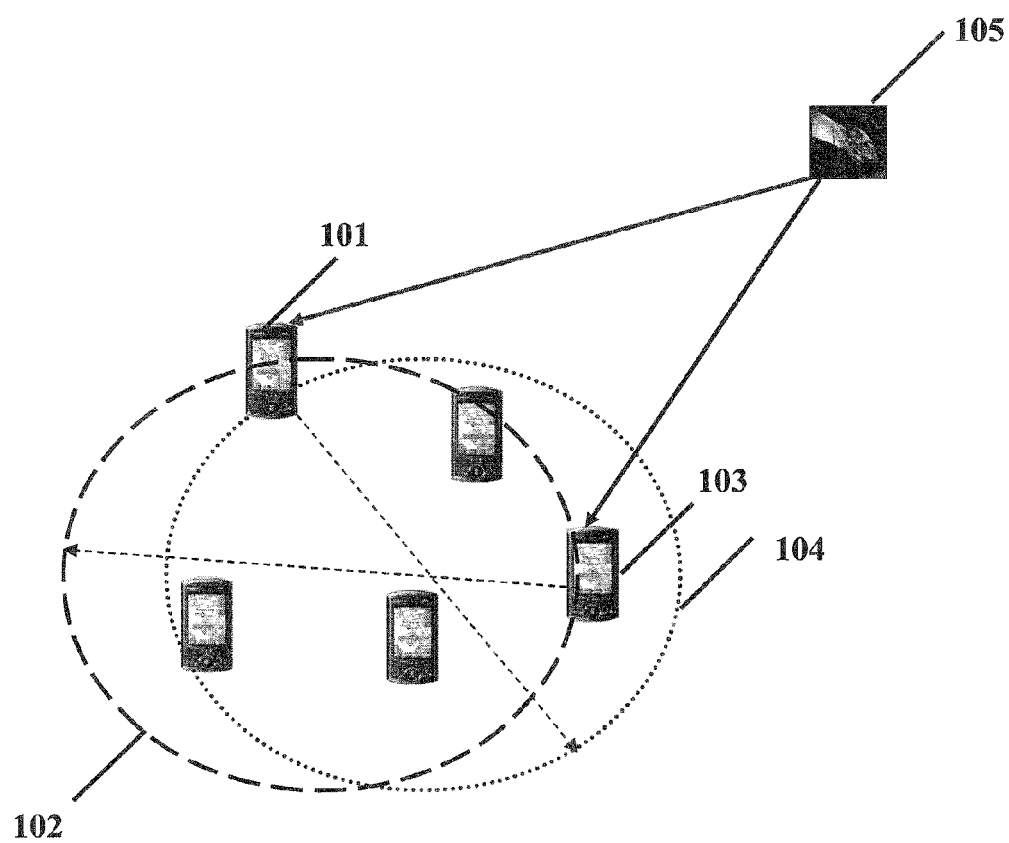
FIG. 1 schematically illustrates an application scenario of illustrative embodiments of the present invention.

Hereinafter, the principle and spirit of the present invention will be described with reference to various illustrative embodiments. It should be understood that these embodiments are provided only to enable those skilled in the art to better understand and further implement the present invention, not intended for limiting the scope of the present invention in any manner.

According to the embodiments of the present invention, a method and apparatus for determining the location of a mobile device is provided.

In this text, it should be understood that each "location" involved is a coordinate pair on a map (for example, a pair of x coordinate and y coordinate); each displacement or velocity involved is a vector, i.e., comprising both number and direction; the unit mW involved indicates miliwatt, and dBm indicates decibel relative to one milliwatt; and various messages involved may, for example, be in a format of various kinds of short-range communications that already exist (such as Bluetooth, WiFi, etc.) or will be developed in future, even in a format derived from dedicated negotiation between various mobile devices for communication. Different message formats and transmission methods have no limitation on the present invention. Besides, each naming is merely for distinguishing and convenience of depiction, which has no any implication of limiting.

Hereinafter, the principle and spirit of the present invention will be described in detail with reference to a plurality of representative embodiments of the present invention.

Main Idea of the Invention

As above mentioned, the location-based service becomes very popular due to its convenience and entertainment nature. However, the inventors find that such location-based service (for example, GeoLife, Micro-Blog, TrafficSense and Pothole Patrol) requires the mobile device to periodically (for example, every 5 seconds) receive signals from satellite utilizing its positioning device (for example, GPS module) so as to calculate its current location, which will incur unacceptable high energy consumption to the mobile device. Such high energy consumption may significantly shorten the battery service time of the mobile phone. Thus, user experience of the mobile device will be dampened.

For overcoming the above drawbacks in the prior art, at least two key challenges must be addressed: first, how to lower the energy consumption of the locating service; and second, how to guarantee locating accuracy (as is known that the locating accuracy of, for example GPS, is less than 10 m).

To this end, the inventors find:

1. The coverage scope of short-range communication, for example Bluetooth, WiFi, and the like is acceptable. For example, the maximum allowed power of the Bluetooth technology is below 2.5 mV (4 dBm), with a coverage of about 10 m;

2. Its energy consumption is notably lowered compared with for example the GPS.

3. In real life, a personal area network (PAN) of the mobile device (for example, provided by Bluetooth, WiFi, etc.) always has a plurality of mobile devices that support locating function and short-range communication mechanism;

4. For the sake of saving battery life, users of these mobile devices would like to share the location required by a locating service with the mobile devices of others; and 5. Energy consumption will be effectively lowered by lowering the frequency of calculating the location required by locating the service.

In view of the above findings, the inventors provide a method and apparatus for determining the location of a mobile device, with its core ideas being summarized below:

A mobile device among a plurality of mobile devices in a PAN area, after obtaining an accurate location through calculation utilizing received satellite signals, may share the location with other mobile devices by using a lower energy-consumption short-range communication mechanism. Therefore, it would be unnecessary for the other mobile devices to calculate their own locations based on the signal received from the satellite. Instead, these mobile devices may estimate their own locations utilizing the accurate location of the mobile device nearby (for example, within about 10 m), so as to reduce the frequency of calculating the location required by locating service utilizing the signal received from the satellite.

For example, suppose there are 9 similar mobile devices exist in the PAN area of the mobile device M. If the mobile device M needs to calculate its location once every 5 seconds based on the satellite signal in the prior art, then, after the technical solution of the present invention is applied, it only needs to calculate its location every 50 seconds to the utmost based on the satellite signal (it would be understandable that if the location relationship between these mobile devices remains relatively stable, the longest time interval may reach 50 seconds. However, if these mobile devices dynamically and randomly join in or leave the current group of mobile devices, an adjustment factor less than 1 may be added to this time interval, for example, 0.5. Therefore, the mobile device M needs to calculate its location once, for example, every 50*0.5=25 seconds, based on the satellite signal), thereby reducing the frequency of calculating the location required by locating service utilizing the signal received from the satellite.

Therefore, energy consumption is reduced because the mobile device does not need to perform a satellite signal-based positioning process that requires high energy consumption. Additionally, accuracy of location estimation by the mobile device may be guaranteed because the communication distance supported by the short-range communication is rather short (generally less than 10 m).

The basic principle of the present invention has been introduced above. Now, various illustrative non-limiting embodiments of the present invention will be described hereinafter.

Illustrative Application Scenario

As mentioned above, the technical solution of the illustrative embodiments of the present invention is applicable to a scenario where at least two mobile devices exist in a PAN area within the coverage of short-range communication. The scenario as illustrated in FIG. 1 is just an example of such scenario. As illustrated in FIG. 1, the PAN area 102 of the mobile device M 101 (for example, provided by Bluetooth or WiFi, etc.) covers a mobile device P 103. The PAN area 104 of the mobile device P 103 likewise covers the mobile device M 101. Therefore, the mobile device M 101 and the mobile device P 103 can communicate utilizing a short-range communication mechanism (for example, Bluetooth or WiFi, etc.). Further, as illustrated in FIG. 1, the mobile device M 101 and the mobile device P 103 may receive signals from the illustrative GPS satellite 105 (not limited to this).

Those skilled in the art may understand that the scenario as illustrated in FIG. 1 is only illustrative. Although FIG. 1 illustrates two mobile devices, a scenario that comprises more mobile devices is likewise applicable to the technical solution according to the illustrative embodiments of the present invention. Although the scenario illustrated in FIG. 1 takes mobile devices as an example, a scenario comprising a plurality of vehicles that have positioning apparatus and vehicle networking apparatus is likewise applicable to the technical solution according to the illustrative embodiments of the present invention. Although FIG. 1 illustrates a global positioning system (GPS) satellite, the satellites adopted by other positioning systems such as Galileo and Beidou are also applicable to the technical solution according to the illustrative embodiments of the present invention.

Illustrative Method

Hereinafter, in combination with the application scenario in FIG. 1 and the example in FIG. 3, a method for determining the location of a mobile device according to the illustrative embodiments of the present invention will be described with reference to FIG. 2.

Figure 2:
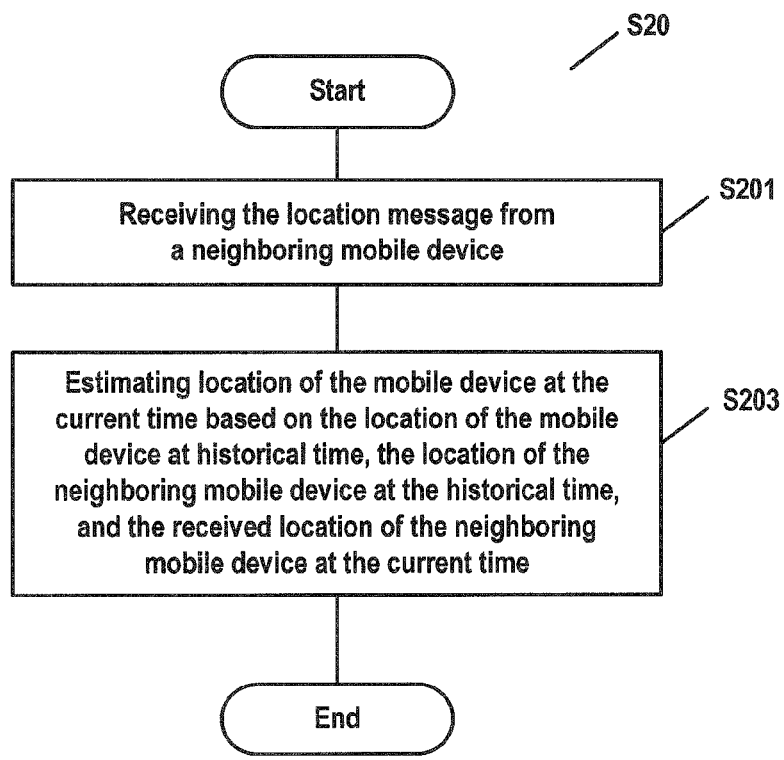
FIG. 2 schematically illustrates a flow chart of a method for determining the location of a mobile device according to the illustrative embodiments of the present invention.

As illustrated in FIG. 2, according to the illustrative embodiments of the present invention, method S20, for example, may comprise receiving the location message from a neighboring device, the location message comprising the location of the neighboring mobile device at the current time as obtained by the neighboring mobile device through calculation utilizing signals received from satellites (step S201).

Figure 3:
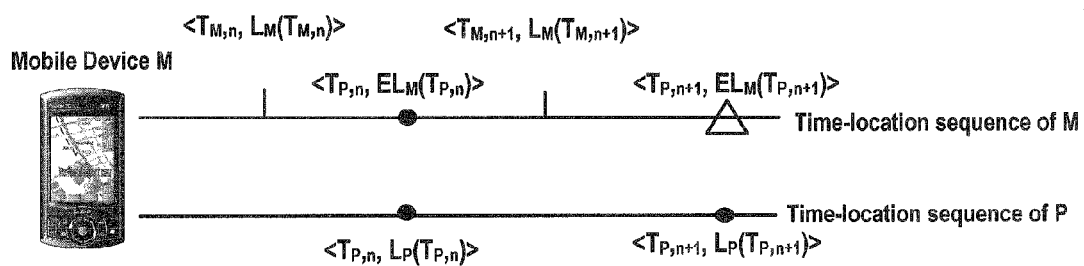
FIG. 3 schematically illustrates the time-location sequence stored in the mobile device according to illustrative embodiments of the present invention.

Specifically, as illustrated in FIGS. 1 and 3, suppose the mobile device M receives the location message from the mobile device P at the $T_{P,n+1}$ time, the location message comprises the accurate location $L_P(T_{P,n+1})$ at the $T_{P,n+1}$ time obtained by the mobile device P through calculation utilizing the signal received from the satellite.

It should be noted that as mentioned above, each mobile device will receive signals from the satellite in a certain time interval so as to calculate its location. According to the illustrative embodiments of the present invention, the mobile device M stores in memory means a time-location sequence obtained through calculating the location utilizing signals received from the satellites, where time-location sequence may be denoted by $<T_{M,1},L_M(T_{M,1})>$, $<T_{M,2},L_M(T_{M,2})>$, ..., $<T_{M,n},L_M(T_{M,n})>$, wherein $L_M(T_{M,k})$ denotes the accurate location (indicated by vertical line in FIG. 3) of the mobile device M at the time $T_{M,k}$ (k=1, 2, ..., n) as calculated based on the signal received from the satellite, and k denotes that the time of receiving the satellite signal is the $k^{th}$ time interval. According to the illustrative embodiments of the present invention, the mobile device (for example, mobile device M) also maintains the time-location sequences obtained through calculating by neighboring mobile devices based on the signals received from the satellite for the neighboring mobile devices (for example, mobile device P), where time-location sequence, for example, is denoted by $<T_{P,1},L_P(T_{P,1})>$, $<T_{P,2},L_P(T_{P,2})>$, ..., $<T_{P,n},L_P(T_{P,n})>$, wherein $L_P(T_{P,k})$ denotes the accurate location (indicated by solid dots in FIG. 3) of the mobile device P at the time $T_{P,k}$ (k=1, 2, ..., n) as calculated based on the signal received from the satellite, k indicates that the time of receiving the satellite signal is the $k^{th}$ time interval. It would be understandable that according to the illustrative embodiments of the present invention, each mobile device, after obtaining the accurate location through calculation, would send the location message comprising the accurate location to other mobile devices within its PAN area via a short-range communication mechanism. Accordingly, the other mobile devices that receive this location message may store in a memory the time-location sequence for the mobile device. Further, it is seen from FIG. 3 that the n+1 time interval of the mobile device M is before the $(n+1)^{st}$ time interval of the neighboring mobile device P. Namely, first, the mobile device M receives satellite signals and calculates its location, and then the mobile device P receives the satellite signals and calculates its location. It should be noted that the length of the location sequence (i.e., time-location sequence) maintained by the mobile device M and obtained through calculation utilizing the satellite signal may be independent of the length of the location sequence (i.e., time-location sequence) received from the neighboring mobile device P. The lengths of the two sequences may not be equal, thus, the subscript n is also different in each sequence.

Those skilled in the art would also appreciate that the location message may be any existing message that is capable of carrying an accurate location of a mobile device or a message specifically designed for implementing the embodiments of the present invention. Different message formats and transmission methods have no limitation on the present invention.

According to the illustrative embodiments of the present invention, the method S20 for example may further comprise estimating the location of the mobile device at the current time based on the stored locations of the mobile device at historical time, the stored locations of the neighboring mobile device at historical time, and the received location of the neighboring mobile device at the current time (step S203).

Specifically, as illustrated in FIGS. 1 and 3, the mobile device M estimates the location of the mobile device M at the current time (for example, $EL_M(T_{P,n+1})$ as illustrated in FIG. 3) based on the stored locations of the mobile device M at historical time (for example, the $EL_M(T_{P,n})$ as illustrated in FIG. 3, i.e., the estimated location), a stored location of the neighboring mobile device P at a historical time (for example, $L_P(T_{P,n})$ as illustrated in FIG. 3), and the received location of the neighboring mobile device P at the current time ($L_P(T_{P,n+1})$).

Next, a more detailed process regarding determining the location of the mobile device M at the current time will be further described.

It should be understood that if a relative displacement between the mobile device M and the mobile device P at the current time can be determined, then the location of the mobile device M at the current time may be determined more accurately based on the accurate location of the mobile device P at the current time plus the relative displacement. Of course, those skilled in the art may understand that this manner is merely illustrative, and the present invention is not limited thereto. Any manner of estimating the location of the mobile device at the current time based on the location of the mobile device at a historical time, the location of a neighboring mobile device at the historical time, and the location of the neighboring mobile device at the current time may be applicable to the present invention.

In view of the above analysis, according to the illustrative embodiments of the present invention, step S203 for example may comprise obtaining the relative displacement between the mobile device M and the neighboring mobile device P at the current time; and calculating a sum of the received location of the neighboring mobile device P at the current time and the relative displacement at the current time, as the location of the mobile device M at the current time, which is denoted by $EL^1_M(t)=L_P(t)+D(M \rightarrow P)$, wherein $EL^1_M(t)$ denotes the estimated location of the mobile device M at the time t (because it would be described hereinafter that the mobile device M estimates the location at t time (denoted by $EL^2_M(t)$) using its own trajectory, the $EL^1_M(t)$ is used to denote the location at t time estimated by the mobile device M utilizing the trajectory of the neighboring mobile device P. It would be understood that the numerical signs 1 and 2 here are only for distinguishing, without creating any limitation to the present invention), $L_P(t)$ denotes the accurate location of the mobile device P at t time, while $D(M \rightarrow P)$ denotes the relative displacement between the mobile device M and the mobile device P at t time.

Hereinafter, a process of obtaining the relative displacement at the current time between mobile devices will be described in detail with reference to specific examples.

Suppose the Relative Displacement Does Not Change

The inventors find that if the relative displacement between the mobile device M and the mobile device P will not change during a certain period of time and the relative displacement between the mobile device M and the mobile device P at a certain or some historical times may be determined, then the relative displacement of the certain or some historical times may be used as the relative displacement at the current time between the two mobile devices. In other words, the location of the mobile device M at the current time may be estimated more accurately based on the accurate location of the mobile device P at the current time plus the relative displacement at a certain or some historical time.

It would be understandable that, for example, if the users of the mobile devices M and P are both in a moving fixed space (for example, a crowded subway taken by the users), the relative displacement therebetween remains nearly unchanged during a rather long period of time. In this scenario, the embodiment of this supposedly unchanged relative displacement may be applied.

As far as the mobile device M is concerned, whether the relative displacement between the two remains unchanged may be checked by comparing the stored time-location sequence of the mobile device M and the time-location sequence of the neighboring mobile device P.

It is seen from the above analysis that according to the illustrative embodiments of the present invention, the step of obtaining, for example, may comprise: calculating the relative displacement (i.e., $D(M \to P, T_{P,n})$) between the mobile device M and the neighboring mobile device P at a same historical time based on the stored location of the mobile device M (for example, $EL_M(T_{P,n})$ as illustrated in FIG. 3) at the historical time and the stored location of the neighboring mobile device P (for example, $L_P(T_{P,n})$ as illustrated in FIG. 3) at the historical time, as the relative displacement therebetween at the current time ($D(M \to P, T_{P,n+1})$), wherein, $D(M \to P, T_{P,n}) = EL_M(T_{P,n}) - L_P(T_{P,n})$, namely, at the $n^{th}$ time interval of the neighboring mobile device P, the relative displacement between the mobile device M and the neighboring mobile device P.

According to some other embodiments of the present invention, the obtaining step, for example, may comprise calculating relative displacements (for example, $D(M \to P, T_{P,n})$ and $D(M \to P, T_{M,n})$, etc.) between the mobile device M and the neighboring mobile device P at a plurality of same historical times based on the stored locations of the mobile device M at the historical times (for example, $L_M(T_{P,n})$, $L_M(T_{M,n})$ and the like as illustrated in FIG. 3) and the stored locations of the neighboring mobile device P at the historical times (for example, $L_P(T_{P,n})$ as illustrated in FIG. 3, and $EL_P(T_{M,n})$ as not illustrated in FIG. 3); and calculating an average value of the relative displacements at the plurality of same historical times (for example, $[D(M \to P, T_{P,n}) + D(M \to P, T_{M,n})]/2$), as the relative displacement ($D(M \to P, T_{P,n+1})$) therebetween at the current time. It may be understood that some locations per se at historical times may be estimated values. Thus, in one embodiment, some historical errors are introduced when calculating the relative displacements. The advantage of calculating the average value of the relative displacements at a plurality of historical times is that it may reduce error, thereby improving the accuracy of determining the relative displacement at a historical time.

According to some other illustrative embodiments of the present invention, after adopting a plurality of estimated values of location, the mobile device M may immediately calculate its own accurate location after receiving the signal from the satellite after receiving the accurate location of the neighboring mobile device P at a certain time. In subsequent calculation of location estimation, the difference between these two accurate locations may be used as the relative displacement at the current time therebetween, thereby further improving the accuracy of determining the relative displacement at the historical time.

Suppose the Relative Velocity Does Not Change

The inventors find that if the relative velocity between the mobile device M and the mobile device P does not change during a certain period of time and the relative velocity between the mobile device M and the mobile device P at a certain historical time can be determined, then the relative displacement at this certain historical time may be used as a base, and the relative displacement at the current time therebetween may be obtained on this basis plus the increased relative displacement between the two mobile devices at the time difference between the historical time and the current time. In other words, the location of the mobile device M at the current time may be estimated more accurately on the basis of the accurate location of the mobile device P at the current time plus the relative displacement at the certain historical time as well as the relative displacement increased between the historical time and the current time with the elapse of time.

As far as the mobile device M is concerned, the velocities of the mobile device M and the neighboring mobile device P may be obtained respectively through the stored time-location sequence of the mobile device M and the stored time-location sequence of the neighboring mobile device P, and whether the relative velocity therebetween maintains unchanged is checked by comparing the relative velocities.

It may be seen from the above analysis that according to the illustrative embodiments of the present invention, the obtaining step, for example, may comprise: calculating the relative displacement (i.e., $D(M \to P, T_{P,n})$) between the mobile device M and the neighboring mobile device P at a same historical time based on the stored location of the mobile device M at the historical time (for example $EL_M(T_{P,n})$ as illustrated in FIG. 3) and the stored location of the neighboring mobile device P at the historical time (for example, $L_P(T_{P,n})$ as illustrated in FIG. 3); calculating a product of the relative velocity between the mobile device M and the neighboring mobile device P ($V(M \to P)$) and the difference between the current time and the same historical time ($\Delta t = T_{P,n+1} - T_{P,n}$); and calculating a sum of the relative displacement ($D(M \to P, T_{P,n})$) at the same historical time and the product ($V(M \to P) * \Delta t$), as the relative displacement ($D(M \to P, T_{P,n+1})$) therebetween at the current time, namely, $D(M \to P, T_{P,n+1}) = D(M \to P, T_{P,n}) + V(M \to P) * \Delta t$.

According to the illustrative embodiments of the present invention, the historical time prefer the latest time (for example, $T_{P,n}$ as illustrated in FIG. 3) when the neighboring mobile device P obtained the location through calculation utilizing the signal received from the satellite.

It is seen from the above depiction that if it is assumed that the relative velocity remains unchanged, it is required to obtain the relative velocity between the mobile device M and the neighboring mobile device P at historical time.

According to the illustrative embodiments of the present invention, the relative velocity may be obtained through the following steps: calculating respective velocities ($V_M = [L_M(T_{M,n+1}) - L_M(T_{P,n})]/[T_{M,n+1} - T_{P,n}]$; $V_P = [EL_P(T_{M,n+1}) - L_P(T_{P,n})]/[T_{M,n-1} - T_{P,n}]$) of the mobile device M and the neighboring mobile device P based on the respective displacements of the mobile device M and the neighboring mobile devices P (for example $L_M(T_{M,n+1}) - EL_M(T_{P,n})$; $EL_P(T_{M,n+1}) - L_P(T_{P,n})$) at their respective historical times and based on the time difference between the historical times (for example, $T_{M,n+1} - T_{P,n}$); and calculating the difference between the velocity of the mobile device M and that of the neighboring mobile device P, as the relative velocity ($V(M \to P) = V_M - V_P$).

Of course, those skilled in the art may understand that the average velocity at a plurality of periods of time may be calculated as the velocity value, which may achieve a more accurate location estimation effect.

Position Calibration

It may be seen from FIG. 3 that the mobile device M likewise stores its own time-location sequence. It would be understandable that the mobile device M may also estimate its location at $T_{P,n+1}$ based on its own historical trajectory.

According to the illustrative embodiments of the present invention, this estimation, for example, may comprise calculating the sum of the following two: the latest location ($L_M(T_{M,n+1})$) obtained by the mobile device M through calculation utilizing a signal received from the satellite; and a product of the velocity ($V_M$) of the mobile device M and the difference ($T_{P,n+1} - T_{M,n+1}$) between the latest time when the mobile device M obtained the location through calculation utilizing the signal received from the satellite and the current time. In other words, the location of the mobile device M at the current time (in this example, indicated by $EL^2_M(T_{P,n+1})$) may be estimated based on the location at the latest historical time plus the displacement experienced within $\Delta t$ time, which is denoted as $EL^2_M(T_{P,n+1})=L_M(T_{M,n+1})+V_M*(T_{P,n+1}-T_{M,n+1})$.

The inventors find that the estimated location may be used to calibrate the location of the mobile device M at the current time as estimated by means of the neighboring mobile device P. In other words, a weighted sum of the two estimated locations may be calculated, wherein the sum of the weights of the two is 1. Further, the mobile device M may determine whose trajectory stability is much stronger based on the stored historical trajectory of its own and the historical trajectory of the mobile device P and then grants a higher weight to the estimated location as obtained utilizing the more stable trajectory. It would be understandable that the calibrated estimated location may reflect the current location of the mobile device M more accurately, which is denoted as $EL_M(T_{P,n+1})= \alpha*EL^1_M(T_{P,n+1})+(1-\alpha)*EL^2_M(T_{P,n+1})$, wherein $\alpha$ ($0<\alpha<1$) is a configurable factor for adjusting the weight between the two estimations.

Other Enhancements

As mentioned above, the more mobile devices capable of supporting the positioning and short-range communication mechanism exist within the PAN area of the mobile device M, the longer is the time interval required by the mobile device M to calculate its own accurate location through receiving a signal from the satellite. According to the illustrative embodiments of the present invention, an actual location calculation interval may, for example, be based on a shortest location calculation interval, a total number of neighboring mobile devices, and an adjusting factor, wherein the location calculation interval indicates the time interval between the times of calculating the location utilizing the signal received from the satellite.

For example, suppose 9 similar mobile devices exist in the PAN area of the mobile device M. If the mobile device M needs to calculate the location once every 5 seconds utilizing the satellite signal in the prior art, then, after the technical solution of the present invention is applied, it only needs to calculate the accurate location once every 50 seconds to the utmost utilizing the satellite signal (as illustrated above). In other words, now, the longest actual location calculation time interval is 50 seconds. Therefore, it achieves an effect of reducing the frequency of calculating the location required by a locating service utilizing a signal received from the satellite.

Besides, according to the embodiments of the present invention, the location message, for example, may further comprise a unique identification of the neighboring mobile device.

According to the illustrative embodiments of the present invention, the total number of neighboring mobile devices is determined through the following manner: sending finding messages to neighboring mobile devices, and counting the replies from the neighboring mobile devices in response to the finding messages, as the total number of neighboring mobile devices. For example, a mobile device broadcasts finding messages, and the number of responses from neighboring mobile devices is just the number of the neighboring mobile devices. It should be understood that the finding message may be any message that is capable of triggering the mobile devices that receive the message to return a response. The format, transmission and reception of the finding message do not constitute a limitation to the present invention, which may be implemented by any existing message delivery mechanism.

Alternatively, according to the illustrative embodiments of the present invention, the total number of neighboring mobile devices, for example, is determined through the following manner: the mobile device may, for example, receive location messages sent from neighboring mobile devices till the unique identification of a neighboring mobile device is repeated; and counting these location messages as the total number of neighboring mobile devices. As mentioned above, neighboring mobile devices may send location messages in a substantially even time interval. Suppose the mobile device receives the location message from the first mobile device again after receiving the $9^{th}$ location message, then it indicates that all surrounding neighboring mobile devices have already sent a location message, then the number of the 9 location messages is just the number of the neighboring mobile devices.

According to the illustrative embodiments of the present invention, the mobile device, for example, may store in association the received location of a neighboring mobile device at the current time, the current time, and the unique identification of the neighboring mobile device, i.e., forming a time-location sequence as above mentioned.

According to illustrative embodiments of the present invention, if the mobile device detects a change of the total number of the neighboring mobile devices (for example, the number of received location messages changes within a reasonable period of time), the method S20 may for example further include: in response to the change of total number of neighboring mobile devices, receiving a signal from the satellite and calculating the location of the mobile device at this time (i.e., the time when the total number of neighboring mobile devices changes); and sending the location of the mobile device at this time to the neighboring mobile devices. The advantage of this operation is that when the number of the neighboring mobile devices changes, each mobile device should contribute to its neighboring mobile devices in calculating the location, i.e., sharing the accurate location calculated by itself at the current time with its neighboring mobile devices, thereby enhancing the accuracy of determining the location.

According to the illustrative embodiments of the present invention, the mobile device receives a signal from the satellite and calculates the location during a random time between 0 time (0 time indicates the time when the mobile device starts initiating the method of the present invention or the time of obtaining the location which is latest calculated by the neighboring device) and the above actual location calculation time interval (for example, 50 seconds to the utmost); and sending the location to the neighboring mobile device. The advantage of this operation is to further contribute to the neighboring mobile devices in calculating locations, and randomizing the time when each mobile device receives the satellite signals.

Illustrative Apparatus

After introducing the method according to the illustrative embodiments of the present invention, next, detailed description will be made to an apparatus (hereinafter, referred to as location determining apparatus 400) for determining the location of a mobile device according to illustrative embodiments of the preset invention with reference to FIG. 4.

Figure 4:
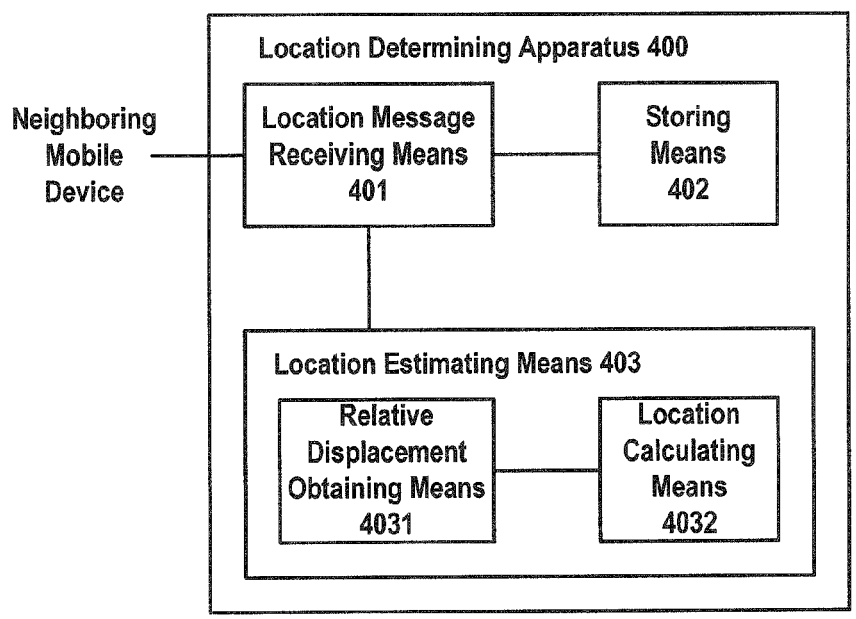
FIG. 4 schematically illustrates a block diagram of an apparatus for determining the location of a mobile device according to the illustrative embodiments of the present invention.

As illustrated in FIG. 4, the location determining apparatus 400, for example, may comprise: location message receiving means 401 configured to receive the location message from a neighboring mobile device, the location message comprising the location of the neighboring mobile device obtained by the neighboring mobile station through calculation utilizing a signal received from a satellite; and location estimating means 403 configured to estimate the location of the mobile device at the current time based on a stored location of the mobile device at a historical time, a stored location of the neighboring mobile device at the historical time, and the received location of the neighboring mobile device at the current time.

According to the illustrative embodiments of the present invention, the location estimating means 403, for example, may comprise: relative displacement obtaining means 4031 configured to obtain a relative displacement between the mobile device and the neighboring mobile device at the current time; and location calculating means 4032 configured to calculate a sum of the received location of the neighboring mobile device at the current time and the relative displacement at the current time, as the location of the mobile device at the current time.

According to the illustrative embodiments of the present invention, the relative displacement obtaining means 4031, for example, may comprise means for calculating a relative displacement between the mobile device and the neighboring mobile device at a same historical time based on the stored location of the mobile device at the historical time and the stored location of the neighboring mobile device at the historical time, as the relative displacement at the current time.

According to the illustrative embodiments of the present invention, the relative displacement obtaining means 4031, for example, may comprise means for calculating relative displacements of the mobile device and the neighboring mobile device at a plurality of same historical times based on the stored locations of the mobile device at the historical times and the stored locations of the neighboring mobile device at the historical times; and means for calculating an average value of the relative displacements at the plurality of same historical times, as the relative displacement at the current time.

According to the illustrative embodiments of the present invention, the relative displacement obtaining means 4031, for example, may comprise means for calculating a relative displacement between the mobile device and the neighboring mobile device at a same historical time based on the stored location of the mobile device at the historical time and the stored location of the neighboring mobile device at the historical time; means for calculating a product of a relative velocity between the mobile device and the neighboring mobile device with the difference between the current time and the same historical time; and means for calculating a sum of the relative displacement at the same historical time and the product, as the relative displacement at the current time.

According to the illustrative embodiments of the present invention, the same historical time, for example, may be the latest time when the neighboring mobile device obtained the location through calculation utilizing the signal received from the satellite.

According to the illustrative embodiments of the present invention, the location determining apparatus 400, for example, may further comprise means for determining a relative velocity based on the following: calculating respective velocities of the mobile device and the neighboring mobile device based on the displacement of the mobile device between locations of the mobile device at its historical times and the displacement of the neighboring mobile device between locations of the neighboring mobile device at its respective historical times and respective time difference between the historical times; and calculating a difference between the velocity of the mobile device and the velocity of the neighboring mobile device, as the relative velocity.

According to the illustrative embodiments of the present invention, the location determining apparatus 400, for example, may further comprise: means for calculating a weighted sum of the location of the mobile device at the current time and two of the following, as the location of the mobile device at the current time: the location of the mobile device as obtained by the latest calculation utilizing the signal received from the satellite; and a product of the velocity of the mobile device and the difference between the latest time when the mobile device obtained the location through calculation utilizing the signal received from the satellite and the current time.

According to the illustrative embodiments of the present invention, the location determining apparatus 400, for example, may further comprise means for determining an actual location calculation interval based on a shortest location calculation interval, a total number of neighboring mobile devices, and an adjusting factor, wherein the location calculation interval indicates the time interval between the times of calculating the location utilizing the signal received from the satellite.

According to the illustrative embodiments of the present invention, the location message further comprises a unique identification of a neighboring mobile device, and the location determining apparatus 400 further comprises means for determining the total number of neighboring mobile devices through the following manner: sending finding messages to neighboring mobile devices, and counting the replies from the neighboring mobile devices in response to the finding messages, as the total number of the neighboring mobile devices; or receiving location messages sent from neighboring mobile devices till a unique identification of a neighboring mobile device repeats, and counting the location messages, as the total number of neighboring mobile devices.

According to illustrative embodiments of the present invention, the location determining apparatus 400, for example, may further comprise: storing means configured to store the received location of the neighboring mobile device at the current time, the current time, and the unique identification of the neighboring mobile device in association.

According to the illustrative embodiments of the present invention, if the total number of neighboring mobile devices changes, the location determining apparatus 400, for example, may further comprise: means for receiving a signal from a satellite and calculating the location of the mobile device at the current time in response to the change of total number of neighboring mobile devices; and means for sending the location of the mobile device at the current time to the neighboring mobile devices.

According to the illustrative embodiments of the present invention, the location determining apparatus 400, for example, may further comprise: means for receiving a signal from a satellite and calculating the location at a random time from 0 time to the actual location calculation interval; and means for sending the location to the neighboring mobile devices.

Illustrative Mobile Device

Figure 5:
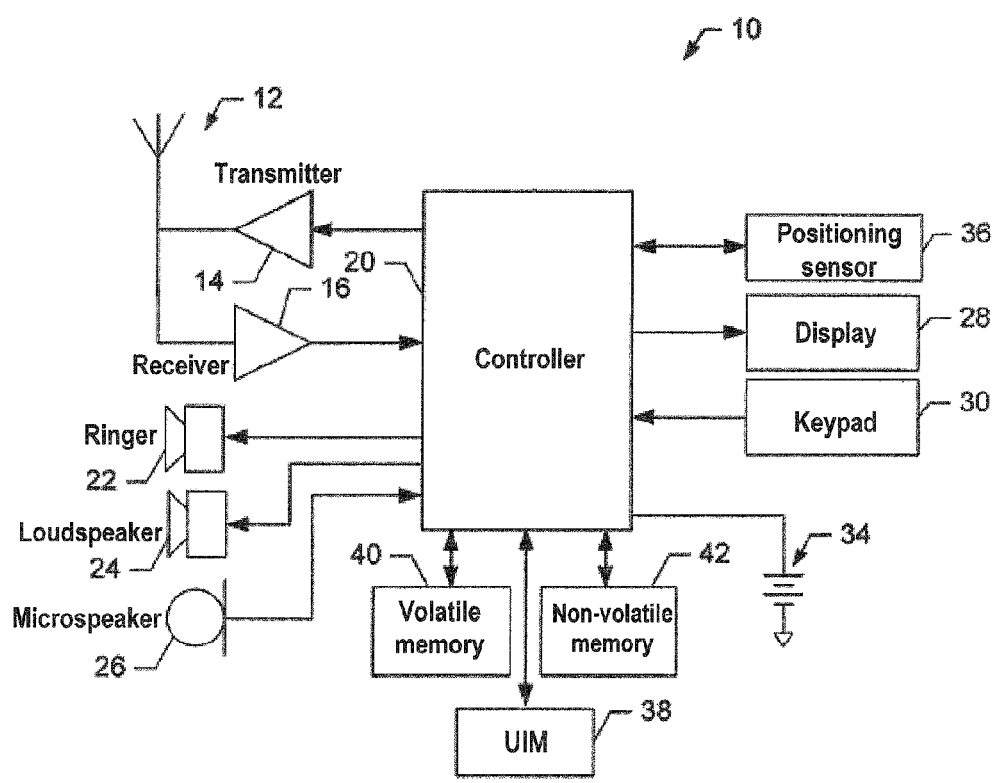
FIG. 5 schematically illustrates a block diagram of a mobile device that benefits from the illustrative embodiments of the present invention and that may be the illustrative apparatus according to the illustrative embodiments of the present invention.

Finally, FIG. 5 schematically illustrates a block diagram of a mobile device 10 that benefits from the illustrative embodiments of the present invention and may be the illustrative apparatus according to the illustrative embodiments of the present invention. However, it should be understood that the mobile phone as illustrated in this figure and described hereinafter is only an example of a class of mobile devices that benefit from the illustrative embodiments of the present invention, instead of limiting the scope of the illustrative embodiments of the present invention. Although a plurality of embodiments of the mobile device 10 have been illustrated for the illustrative purpose, for example, a portable digital assistant (PDA), pager, mobile TV, gaming device, laptop, camera, video camera, audio/video player, radio, GPS device, or any other type of mobile device with any combination of the above, as well as other type of voice and textual communication system, may easily employ the illustrative embodiments of the present invention.

In addition, although the mobile device 10 may employ the plurality of embodiments of the method of the present invention, an apparatus other than the mobile device may also employ the method of the illustrative embodiments of the present invention. Further, although the method and apparatus according to the illustrative embodiments of the present invention have been described above mainly with reference to the mobile communication application, it should be understood that the method and apparatus according to the illustrative embodiments of the present invention may be applied in the mobile communication business and beyond the mobile communication business in combination with various other applications.

The mobile device 10 may comprise an antenna 12 (or a plurality of antennas) operatively communicating with a transmitter 14 and a receiver 16. The mobile device 10 may further comprise means configured to provide signals to the transmitter 14 and receive signals from the receiver 16, respectively, for example, the controller 20 or other processing unit. The signal comprises a signaling message applicable to the cellular system air interface standard, as well as user voice, received data and/or user generated data. In this regard, the mobile device 10 may be operated utilizing one or more air interface standards, communication protocol, modulation type, and access type. For example, the mobile device 10 may operate according to any communication protocol among a plurality of first generation, second generation, third generation and/or fourth generation, and other communication protocols. For example, the mobile device 10 may operate according to the second generation (2G) wireless communication protocol IS-136 (time division multiple access (TDMA)), GSM (global mobile communication system) and IS-95 (code division multiple access), or according to the third generation (3G) wireless communication protocol such as universal mobile telecommunications system (UMTS), CDMA2000, wideband CDMA (WCDMA) and time division-synchronization TDMA (TD-SCDMA), or according to the 3.9 generation (3.9G) wireless communication protocol such as evolved universal terrestrial radio access network (E-UTRAN), or according the fourth generation (4G) wireless communication protocol. Instead (or in exclusion), the mobile device 10 may operation according to a non-cellular communication mechanism. For example, the mobile device 10 may communication in a wireless local area network (WLAN) or other communication network. In addition, the mobile device 10 may communicate according to any of the following technologies, such as radio frequency (RF), infrared ray (IrDA) or a plurality of different wireless networking technologies (including WLAN technologies, such as IEEE 802.11 (for example, 802.11a, 802.11b, 802.11g, 802.11n, etc.), a global microwave access interoperability (WiMAX) technology, such as IEEE 802.16 and/or wireless personal area network (WPAN) technology, for example, IEEE 802.15, Bluetooth (BT), ultra wideband (UWB) and/or similar technology.

It should be understood that means like controller 20 may comprise a circuit for implementing the audio and logic functions of the mobile device 10. For example, the controller 20 may comprise a digital signal processor device, a microprocessor device, and various A/D converters, D/A converters, and other support circuits. The control and signal processing functions of the mobile device 10 are allocated among these devices based on their corresponding capabilities. Therefore, the controller 20 may comprise a function of performing convolutional coding and interleave to the message and data before modulation and transmission. The controller 20 may further comprise an internal voice encoder and may comprise an interval data modem. In addition, the controller 20 may comprise a function of operating one or more software programs stored in a memory. For example, the controller 20 may operate a connectivity program, for example, a conventional Web browser. The connectivity program may then allow the mobile device 10 to transmit and receive Web contents for example according to a wireless application protocol (WAP), a hypertext transfer protocol (HTTP) and/or a similar protocol, for example, location-based content and/or other webpage content.

The mobile device 10 may further comprise a user interface that comprises all output devices connected to the controller 20, for example, a conventional earphone or speaker 24, a ringer 22, a microphone 26, a display 28, and a user input device. A user input interface allowing the mobile device 10 to receive data may comprise any device in a plurality of devices that allow the mobile device 10 to receive data, for example, a keypad 30, a touch display (not shown) and other input device. In an embodiment comprising a keypad 30, the keypad 30 may comprise conventional digital keys (0-9) and associated keys (#, *) and other hard keys and soft keys for operating the mobile device 10. Instead, the keypad 30 may comprise a conventional QWERTY keypad arrangement. The keypad 30 may also comprise various kinds of soft keys having association functions. In addition or instead, the mobile device 10 may further comprise an interface device such as a joystick or other user input devices. The mobile device 10 further comprises various circuit power supplies required for operating the mobile device 10 and alternatively a battery 34 that may provide mechanical vibration as detectable output, for example, a vibrating battery package.

The mobile device 10 may further comprise a user identification module (UIM) 38. The UIM 38 is usually a memory device with a processor built in. The UIM 38 may for example comprise a user identification module (SIM), a universal integrated circuit card (UICC), a universal user identification module (USIM), or a removable user identification module (R-UIM), etc. The UIM 38 always stored an information element associated with the mobile user. Besides UIM 38, the mobile device 10 may be further provided with a memory. For example, the mobile device 10 may comprise a volatile memory 40, for example, comprising a volatile random access memory (RAM) of a cache memory for temporarily storing data. The mobile device 10 may also comprise other non-volatile memory 42 that is embedded or removable. In addition or instead, the non-volatile memory 42 may also comprise an electrically erasable programmable read-only memory (EEPROM), a flash, etc. For example, the non-volatile memory may be available from the SanDisk of Sunnyvale, Calif., or Lexar Media of Fremont, Calif. The memory may store any information and data in a plurality of pieces of information and data available for the mobile device 10 for implementing the functions of the mobile device 10. For example, the memory may comprise an identifier that is capable of uniquely identifying the mobile device 10, for example, the international mobile equipment identity (IMEI) code, and may store the received current time-locations of the neighboring mobile devices and the current time and the unique identification of the neighboring devices in association. Specifically, the memory may store an application that is executed by the controller 20, the controller determining the current location of the mobile device 10.

The mobile device 10 may further comprise a positioning sensor 36 that communicates with the controller 20, for example, a global positioning system (GPS) module. The positioning sensor 36 may be any apparatus, device or circuit for performing location determination so as to position the mobile device 10. The positioning sensor 36 may comprise all hardware for performing location determination so as to position the mobile device 10. Alternatively or additionally, the positioning sensor 36 may store the instructions executed by the controller 20 utilizing a memory device of the mobile device 10, and its storage manner is software required for determining the location of the mobile device 10. Apparently, this illustrative positioning sensor 36 may be a GPS module. However, the positioning sensor 36 may comprise or alternatively be implemented as for example an auxiliary global positioning system (auxiliary GPS) sensor or positioning client. The auxiliary GPS sensor or positioning client may communicate with a network device such as an air or ground sensor so as to receive and/or send a message used for determining the location of the mobile device 10. In this regard, locating of the mobile device 10 may be determined by for example the above GPS, cell ID, signal triangle measurement, or other mechanisms. In one illustrative embodiment, the positioning sensor 36 comprises a pedometer or an inertia sensor. Therefore, the positioning sensor 36 may determine the location of the mobile device 10, for example, with reference to the longitude and latitude directions as well as height direction of the mobile device 10, or positioning with respect to a reference point, for example, a target point or a start point. Then, the information from the positioning sensor 36 may be transmitted to the memory of the mobile device 10 or another memory device, so as to be stored as positioning history or location information. In addition, the positioning sensor 36 may transmit/receive location information via the transmitter 14/receiver 16 utilizing the controller 20, for example, locating of the mobile device 10.

The structural block diagram in FIG. 5 is shown only for illustration purpose, and is not intended to limit the invention. In some cases, some devices can be added or reduced as required.

Embodiments of the present invention can be implemented with software, hardware or the combination thereof. The hardware part can be implemented by a dedicated logic; the software part can be stored in a memory and executed by a proper instruction execution system such as a microprocessor or a dedicated designed hardware. The normally skilled in the art may understand that the above method and apparatus may be implemented with computer-executable instructions and/or in processor controlled codes, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present invention may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

It should be noted that although a plurality of means or sub-means of the location determining apparatus have been mentioned in the above detailed depiction, such division is merely non-compulsory. In actuality, according to the embodiments of the present invention, the features and functions of the above described two or more means may be embodied in one means. In turn, the features and functions of the above described one means may be further embodied in more means.

Besides, although operations of the present invention method are described in a particular order in the drawings, it does not require or imply that these operations must be performed according to this particular sequence, or a desired outcome can only be achieved by performing all shown operations. On the contrary, the execution sequences for the steps as depicted in the flowcharts may change. Additionally or alternatively, some steps may be omitted, a plurality of steps may be merged into one step, or a step may be divided into a plurality of steps for execution.

Although the present invention has been depicted with reference to a plurality of embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A method for determining a location of a mobile device, comprising:
    calculating a location of a neighboring mobile device at a current time by utilizing a signal received from a satellite;
    receiving a location message from the neighboring mobile device, wherein the location message comprises the location of the neighboring mobile device; and
    estimating a location of the mobile device at a current time based on the following: (i) stored locations of the mobile device at a historical time, (ii) stored locations of the neighboring mobile device at a historical time, and (iii) the received location of the neighboring mobile device at the current time.

2. The method according to claim 1, wherein estimating the location of the mobile device at the current time comprises:
    obtaining a relative displacement between the mobile device and the neighboring mobile device at the current time; and
    calculating the location of the mobile device at the current time as a sum of the received location message of the neighboring mobile device at the current time and the relative displacement at the current time.

3. The method according to claim 2, wherein obtaining the location of the mobile device at the current time comprises:
    calculating the relative displacement at the current time as a relative displacement between the mobile device and the neighboring mobile device at a same historical time based on the stored locations of the mobile device at the historical time and the stored locations of the neighboring mobile device at the historical time.

4. The method according to claim 2, wherein obtaining the location of the mobile device at the current time comprises:
    calculating a plurality of relative displacements between the mobile device and the neighboring mobile device at a plurality of same historical times based on a plurality of stored locations of the mobile device at the plurality of same historical times and a plurality of the stored locations of the neighboring mobile device at the plurality of historical times; and calculating the relative displacement at the current time as an average value of the plurality of relative displacements at the plurality of same historical times.

5. The method according to claim 2, wherein obtaining the location of the mobile device at the current time comprises:

calculating the relative displacement between the mobile device and the neighboring mobile device at a same historical time based on a plurality of stored locations of the mobile device at the historical time and based on a plurality of stored locations of the neighboring mobile device at the same historical time;

calculating a product of a relative velocity between the mobile device and the neighboring mobile device and a difference between the current time and the same historical time; and calculating the relative displacement at the current time as the sum of the relative displacement at the same historical time and the product.

6. The method according to claim 5, wherein the same historical time is a latest time when the neighboring mobile device obtained the location from calculating the location of a neighboring mobile device at the current time by utilizing the signal received from the satellite.

7. The method according to claim 5, wherein the relative velocity is calculated based on the following:

calculating a plurality of velocities of the mobile device and the neighboring mobile device based on a displacement of the mobile device between a plurality of locations of the mobile device at a plurality of historical times and based on a displacement of the neighboring mobile device between the locations of the neighboring mobile device at the plurality of historical times and a plurality of time differences between the historical times of the neighboring mobile device; and calculating the relative velocity as a difference between a velocity of the mobile device and a velocity of the neighboring mobile device.

8. The method according to claim 2, further comprising:

calculating the location of the mobile device at the current time, wherein the location of the mobile device at the current time comprises a weighted sum of the following:

a location of the mobile device at the current time;

a location obtained by the mobile device at a latest time which is calculated utilizing the signals received from the satellite; and a product of a velocity of the mobile device; and a difference between the location of the mobile device at the current time and the location of the mobile device at the latest time which is calculated utilizing the signal received from the satellite.

9. The method according to claim 1, further comprising:

determining an actual location calculation interval based on the following: (i) a shortest location calculation interval, (ii) a total number of neighboring mobile devices, and (iii) an adjusting factor, wherein the location calculation interval indicates an interval between times which are calculated utilizing signals received from the satellite.

10. The method according to claim 9, wherein the location message further comprises a unique identification of the neighboring mobile device; and wherein determining the total number of the neighboring mobile devices is comprises:

sending a plurality of finding messages to the neighboring mobile devices; and counting a plurality of replies from the neighboring mobile devices in response to the plurality of finding messages, wherein the plurality of replies is counted as the total number of the neighboring mobile devices.

11. The method according to claim 10, further comprising:

storing in an association comprising the following: (i) the received location of the neighboring mobile device at the current time, (ii) the current time, (iii) and the unique identification of the neighboring mobile device.

12. The method according to claim 9, further comprising:

receiving a plurality of signals from the satellite;

calculating the location of the mobile device at the current time, in response to a change of the total number of the neighboring mobile devices; and sending the location of the mobile device at the current time to the neighboring mobile devices.

13. The method according to claim 12, further comprising:

receiving the signal from the satellite and calculating the location at a random time between time 0 and the actual location calculation interval; and sending the location to the plurality of neighboring mobile devices.

14. An apparatus for determining a location of a mobile device, comprising:

calculating means configured to calculate a location of a neighboring mobile device at a current time by utilizing a signal received from a satellite;

location message receiving means configured to receive the location message from the neighboring mobile device, wherein the location message comprises the location of the neighboring mobile device at a current time; and location estimating means configured to estimate a location of the mobile device at the current time based on the following: (i) a stored location of the mobile device at a historical time, (ii) a stored location of the neighboring mobile device at the historical time, and (iii) the received location of the neighboring mobile device at the current time.

15. The apparatus according to claim 14, wherein the location estimating means comprises:

relative displacement obtaining means configured to obtain a relative displacement between the mobile device and the neighboring mobile device at the current time; and location calculating means configured to calculate the location of the mobile device at the current time as a sum, wherein the sum comprises the received location of the neighboring mobile device at the current time and the relative displacement at the current time.

16. The apparatus according to claim 15, wherein the relative displacement obtaining means comprises:

means for calculating the relative displacement at the current time as a relative displacement between the mobile device and the neighboring mobile device at a same historical time, wherein the relative displacement comprises the stored location of the mobile device at the historical time and the stored location of the neighboring mobile device at the historical time.

17. The apparatus according to claim 15, wherein the relative displacement obtaining means comprises:

means for calculating a plurality of relative displacements between the mobile device and a plurality of neighboring mobile devices at a plurality of same historical times based on a plurality of stored locations of the mobile device at a plurality of historical times and the plurality of stored locations of the neighboring mobile device at the plurality of same historical times; and means for calculating the relative displacement at the current time as an average value of the plurality of relative displacements at the plurality of same historical times.

18. The apparatus according to claim 15, wherein the relative displacement obtaining means comprises:

means for calculating a relative displacement between the mobile device and the neighboring mobile device at a same historical time based on the stored location of the mobile device at a plurality of historical times and based on the stored location of the neighboring mobile device at the same historical time;

means for calculating a product of a relative velocity between the mobile device and the neighboring mobile device;

means for calculating a difference between the current time and the same historical time; and means for calculating the relative displacement at the current time as a sum of the relative displacement at the same historical time and the product.

19. The apparatus according to claim 18, wherein the same historical time is the latest time when the neighboring mobile device obtained a location which is calculated utilizing the signal received from the satellite.

20. The apparatus according to claim 18, further comprising means for determining the relative velocity based on the following:

calculating a plurality of respective velocities of the mobile device and the neighboring mobile device which is based on the displacement of the mobile device between a plurality of locations of the mobile device at a plurality of historical times and the displacement of the neighboring mobile device between the plurality of locations of the neighboring mobile devices at the plurality of historical times and a plurality of time differences between the historical times; and calculating a plurality of relative velocities as a difference between the velocity of the mobile device and the velocity of the neighboring mobile device.

21. The apparatus according to claim 15, further comprising:

means for calculating the location of the mobile device at the current time as the following:

a weighted sum of the location of the mobile device at the current time and the following two:

a location obtained by the mobile device at the latest time which is calculated utilizing the signal received from the satellite;

a product of the velocity of the mobile device; and a difference between the current time and the latest time when the mobile device obtained the location which is calculated utilizing the signal received from the satellite.

22. The apparatus according to claim 14, further comprising:

means for determining an actual location calculation interval based on the following (i) a shortest location calculation interval, (ii) a total number of a plurality of neighboring mobile devices, (iii) and an adjusting factor, wherein the location calculation interval indicates an interval between a plurality of times which are calculated utilizing signals received from the satellite.

23. The apparatus according to claim 22, wherein the location message further comprises a unique identification of the neighboring mobile device; and wherein determining the total number of the plurality of neighboring mobile devices comprises:

sending a plurality of finding messages to the plurality of neighboring mobile devices; and counting replies from the plurality of neighboring mobile devices in response to the finding messages as the total number of the neighboring mobile devices.

24. The apparatus according to claim 23, further comprising:

storing means configured to store in an association the following: (i) a received location of the neighboring mobile device at the current time, (ii) the current time, (iii) the unique identification of the neighboring mobile device.

25. The apparatus according to claim 22, further comprising means for receiving a signal from the satellite; and means for calculating the location of the mobile device at the current time, in response to a change of the total number of the neighboring mobile devices; and means for sending the location of the mobile device at the current time to the plurality of neighboring mobile devices.

26. The apparatus according to claim 24, further comprising:

means for receiving the signal from the satellite;

means for calculating the location at a random time between time 0 and the actual location calculation interval; and means for sending the location to the plurality of neighboring mobile devices.

* * * * *